Patented Oct. 19, 1943

2,332,097

UNITED STATES PATENT OFFICE 2,332,097

INSECTICIDE

Edward R. McGovran, Hyattsville, Md.; dedicated to the free use of the People of the United States No Drawing. Application September 18, 1942, Serial No. 458,883

4 Claims. (Cl. 167—24)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

I hereby dedicate the invention herein described to the free use of the people in the territory of the United States to take effect on the granting of a patent to me.

This invention relates to an insecticide, and in particular to activators for the pyrethrin in pyrethrum extract insect sprays, and has for its object the improvement in such sprays whereby their lethal effect is increased.

I have found that the addition of any of the following chemicals, methyl phenyl nitrosoamine, di-tert.-amyl phenoxyethanol, or 2,4-diamylcyclohexanol, to a spray comprising a highly refined light petroleum oil base impregnated with pyrethrum extract, greatly increases its lethal effect, as shown for example by the following data on each of the three species tested on house flies.

| Spray material in oil base | Per cent of mortality |
|---|---|
| .05% pyrethrins | 12 |
| .10% pyrethrins | 25 |
| 5.00% methyl phenyl nitrosoamine | 11 |
| 5.00% di-tert.-amyl phenoxyethanol | 6 |
| 5.00% 2,4-diamylcyclohexanol | 12 |

SPECIES A

| | |
|---|---|
| .05% pyrethrins and 3.00% methyl phenyl nitrosoamine | 65 |
| .05% pyrethrins and 1.00% methyl phenyl nitrosoamine | 32 |

SPECIES B

| | |
|---|---|
| .05% pyrethrins and 5.00% di-tert.-amyl phenoxyethanol | 53 |

SPECIES C

| | |
|---|---|
| .05% pyrethrins and 5.00% 2,4-diamylcyclohexanol | 43 |

These figures show that the addition of any of the activators to petroleum oil base fly sprays containing small amounts of pyrethrum extract increases the lethal effect of the sprays on house flies to a much greater extent than the additive lethal effect due to mere addition of the activator. Referring to species A, for example, the additive effect of a .05% pyrethrins and a 5.00% methyl phenyl nitrosoamine spray material would produce a 23% mortality. Actually, a .05% pyrethrin and a 3.00% methyl phenyl nitrosoamine spray material produced a 65% mortality. The same quantity of pyrethrins and only 1.00% of methyl phenyl nitrosoamine produced a 32% mortality, yet higher than the 23% additive effect expected using the 5.00% of methyl phenyl nitrosoamine. Corresponding results are shown for the other species.

Activated pyrethrum extract petroleum oil base sprays can be used for the same purposes and can be applied in a manner similar to other impregnated petroleum oil base sprays in general use. They may be sprayed or atomized into the air or directly onto the insects by hand or by power sprayers. Activated pyrethrum extract can also be applied in emulsified form in water, or it can be used in the preparation of insecticidal dusts, or for treating the surface of water to destroy noxious insect life.

The above examples are not to be construed as limiting the proportions or concentrations of the ingredients used, as the proportioning of materials is not critical.

Having thus described the invention, what is claimed is:

1. An insecticide containing methyl phenyl nitrosoamine and pyrethrum extract.
2. An insecticide containing methyl phenyl nitrosoamine and pyrethrum extract in a petroleum oil base.
3. An insecticide containing 2,4-diamylcyclohexanol and pyrethrum extract.
4. An insecticide containing 2,4-diamylcyclohexanol and pyrethrum extract in a petroleum oil base.

EDWARD R. McGOVRAN.